United States Patent
Muldoon

(10) Patent No.: US 12,474,584 B2
(45) Date of Patent: Nov. 18, 2025

(54) HYBRID PASSTHROUGH AUGMENTED REALITY DISPLAY

(71) Applicant: GOOGLE LLC, Mountain View, CA (US)

(72) Inventor: Ian Rickard Muldoon, Brookdale, CA (US)

(73) Assignee: GOOGLE LLC, Mountain View, CA (US)

( * ) Notice: Subject to any disclaimer, the term of this patent is extended or adjusted under 35 U.S.C. 154(b) by 0 days.

(21) Appl. No.: 18/415,263

(22) Filed: Jan. 17, 2024

(65) Prior Publication Data
US 2024/0241382 A1     Jul. 18, 2024

Related U.S. Application Data

(60) Provisional application No. 63/439,537, filed on Jan. 17, 2023.

(51) Int. Cl.
*G02B 27/01*     (2006.01)
*G06T 19/00*     (2011.01)

(52) U.S. Cl.
CPC ........ *G02B 27/0172* (2013.01); *G06T 19/006* (2013.01)

(58) Field of Classification Search
CPC .................................................. G02B 27/0172
See application file for complete search history.

(56) References Cited

U.S. PATENT DOCUMENTS

| | | | |
|---|---|---|---|
| 11,024,082 B2 | 6/2021 | Lee et al. | |
| 2018/0352150 A1* | 12/2018 | Purwar | G06T 7/536 |
| 2019/0114950 A1* | 4/2019 | Calm | G09G 3/20 |
| 2020/0225496 A1* | 7/2020 | Calm | G09G 3/3696 |
| 2021/0271081 A1* | 9/2021 | Yun | H04N 13/344 |

OTHER PUBLICATIONS

Krajancich, Brooke et al., "Factored Occlusion: Single Spatial Light Modulator Occlusion-capable Optical See-through Augmented Reality Display IEEE Transactions on Visualization and Computer Graphics", Factored Occlusion AR Display | IEEE VR 2020, <<https://www.computationalimaging.org/publications/factored-occlusion-ar-display-ieee-vr-2020/>>, Accessed May 6, 2025, 5 pages.

* cited by examiner

*Primary Examiner* — Chun-Nan Lin

(57) ABSTRACT

A near-eye display system includes an image source, an occluder display, an additive display, a world-facing camera, and a process. The image source projects light including an image. The occluder display displays an occluder mask, blocking light from the real world. The additive display combines the light from the image source with the real world light not blocked by the occluder display. The world-facing camera captures a world image. The processor obtains the occluder mask based on a virtual reality (VR image) and obtains an estimated occlusion image representing an estimate of a user's blurred view of the occluder display. The processor further generates the image based on the VR image, the estimated occlusion image, and the world image.

20 Claims, 8 Drawing Sheets

HYBRID PASSTHROUGH AUGMENTED REALITY DISPLAY

BACKGROUND

See-through near-eye augmented reality (AR) and mixed reality (XR) displays are advanced technologies designed for integrating digital visual content with the physical environment. These displays project computer-generated imagery into the user's field of view, allowing for the simultaneous perception of virtual and real-world elements. Central to this technology is its transparent or semi-transparent section, which enables the overlay of digital information onto the real world without blocking the user's view of their surroundings. This is accomplished using sophisticated optics and motion-tracking techniques that align digital overlays with the user's real-world perspective. Such displays have significant applications across various industries, including education, design, manufacturing, and entertainment, enhancing how users interact with digital data.

SUMMARY OF EMBODIMENTS

In accordance with one aspect, a method includes displaying, based on a virtual reality (VR) image, an occluder mask at an occluder display of a near-eye display system. An estimated occlusion image representing an estimate of a user's blurred view of the occluder display is obtained. An image is displayed at an additive display of the near-eye display system based on the VR image, the estimated occlusion image, and a world image representing a view of a physical environment from the perspective of the user.

In accordance with another aspect, a near-eye display system includes an image source, an occluder display, an additive display, a world-facing camera, and a process. The image source projects light including an image. The occluder display displays an occluder mask, blocking light from the real world. The additive display combines the light from the image source with the real world light not blocked by the occluder display. The world-facing camera captures a world image. The processor obtains the occluder mask based on a virtual reality (VR image) and obtains an estimated occlusion image representing an estimate of a user's blurred view of the occluder display. The processor further generates the image based on the VR image, the estimated occlusion image, and the world image.

In accordance with a further aspect, a non-transitory computer-readable medium embodies a set of executable instructions. The set of executable instructions to manipulate at least one processor to obtain, based on a virtual reality (VR image), an occluder mask for display at an occluder display of a near-eye display system. The set of executable instructions further manipulate the at least one processor to obtain an estimated occlusion image representing an estimate of a user's blurred view of the occluder display. The set of executable instructions also manipulate the at least one processor to generate, for display at an additive display of the near-eye display system, an image based on the VR image, the estimated occlusion image, and a world image representing a view of a physical environment from a perspective of the user.

BRIEF DESCRIPTION OF THE DRAWINGS

The present disclosure may be better understood, and its numerous features and advantages made apparent to those skilled in the art by referencing the accompanying drawings. The use of the same reference symbols in different drawings indicates similar or identical items.

DETAILED DESCRIPTION

Figure 1:
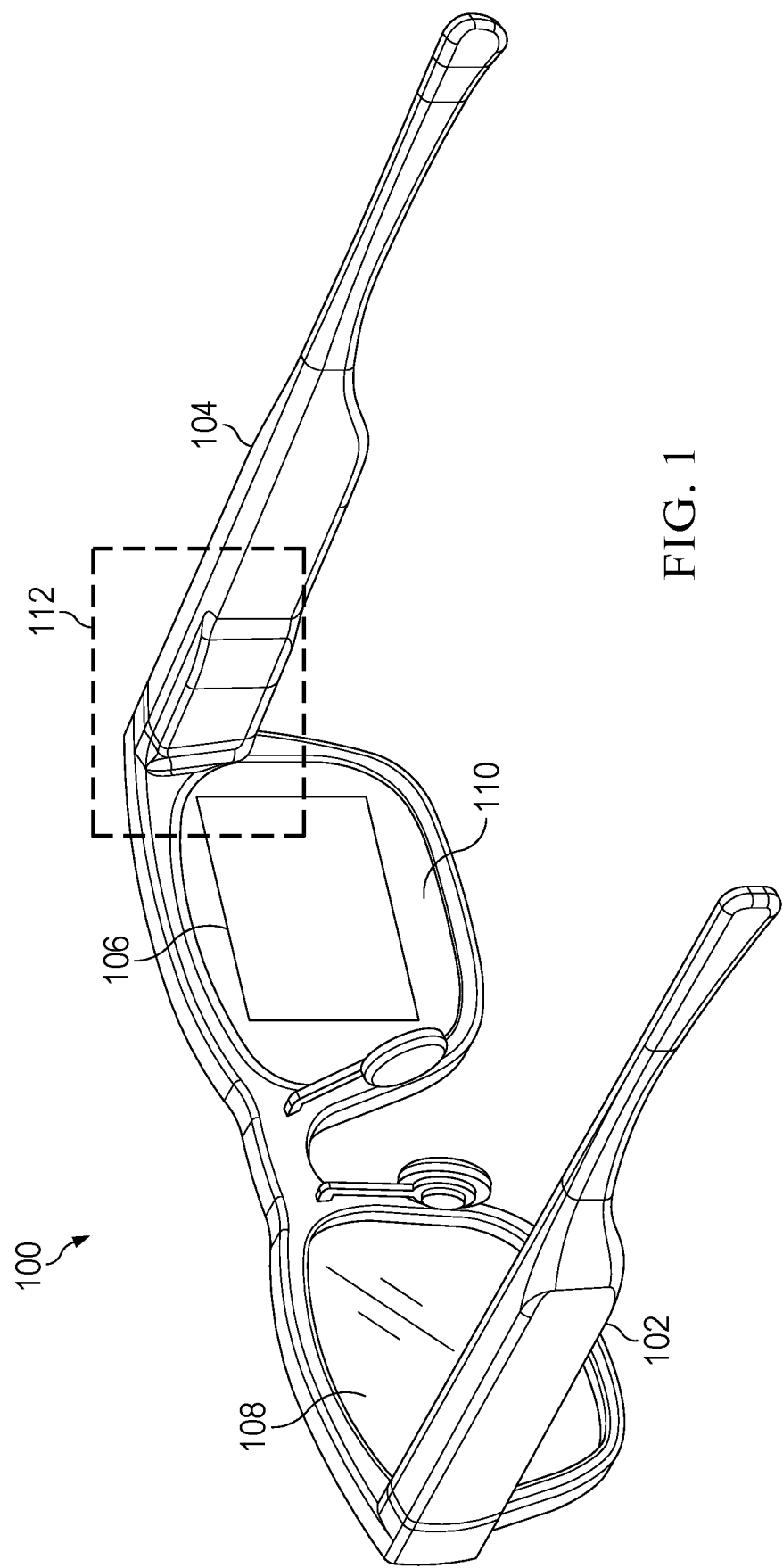
FIG. 1 is a diagram illustrating an example display system in accordance with some embodiments.

See-through near-eye AR (or XR) displays are designed to combine computer-generated imagery with ambient light that passes through their transparent or semi-transparent sections. Traditional see-through AR displays tend to produce virtual objects that appear ghostly, as they can only add light without removing it. One method to counter this involves using pixelated dimming panels to give virtual objects a more solid appearance. However, a challenge arises as these panels, being very close to the eye, appear out of focus. To achieve fully opaque objects, the masking image on the dimming display is typically made larger than the virtual object itself. This technique ensures that the mask significantly obscures any light coming from behind the object as seen from the eye's perspective but results in solid virtual objects being surrounded by a noticeable dark halo or border.

In comparison, digital passthrough (also called video see-through) AR devices capture an image of the real world using camera(s), combine it with rendered content digitally, and display it through optics similar to those in virtual reality (VR) goggles. Digital passthrough AR offers more seamless integration of virtual and real objects but restricts the view of the world and introduces substantial artifacts. These artifacts include noise, blur, limited dynamic range, flicker, loss of focus cues, vergence-accommodation mismatch, a "blind spot" between the VR view and surrounding direct view of the world, and near total interruption of vision in the event of a system failure (software crash, dead battery, etc.).

To address these or other issues, the following describes embodiments of a see-through AR display that employs pixelated dimming and digital passthrough techniques to fill in the dark borders that typically form around virtual objects when using pixelated dimming. The result is an AR display that closely matches the capabilities of a digital passthrough system but with reduced severity of artifacts and limitations typically present in conventional passthrough systems. As described in detail below, the see-through AR display includes (per eye) a world-facing "passthrough" camera(s), a source of a virtual content image (also referred to herein as the "VR image") to be displayed, a see-through spatially-structured (segmented or pixelated) world-dimming display (also referred to herein as the "occluder display"), one or more processing components, and see-through (additive) augmented reality display (also referred to herein as the "AR display").

The world-facing "passthrough" camera(s) and associated processing component(s) compute an estimated view (also referred to herein as the "world image") of the world from the perspective of the eye. The source of the VR image is any source capable of generating or providing a VR image to the see-through AR display. Examples of the source include a rendering system, a playback system, an external interface, a combination thereof, or the like. In at least some embodiments, the source provides opacity information in addition to the VR image. The opacity information, in at least some embodiments, is embedded within a color image through one or more techniques, such as chroma-keying, or communicated independently as an alpha channel. Based on the opacity information from the VR image, the occluder display and associated processing component(s) compute an occluder image to display (also referred to herein as the "occluder mask") that results in the relevant areas of the view of the world being sufficiently dimmed to the eye. The image processing component estimates the eye's blurred view of the occluder display. This estimation is herein referred to as the "occlusion estimate"). In at least some embodiments, the occlusion estimate is calculated as part of or during the occluder mask calculation. The AR display is configured to present an image (also referred to herein as the "display image") derived from, for example, the world image, the VR Image, and the occlusion estimate.

By deriving the display image from the world image, the VR Image, and the occlusion estimate, any dark clouds that typically surround objects in an image generated by a conventional see-through AR display are filled in. As such, the techniques described herein provide a hybrid see-through AR display that employs pixelated dimming and digital passthrough techniques, resulting in the see-through AR display having the capabilities of a digital passthrough AR display with dramatically reduced artifacts. It should be understood that techniques described herein apply to either monocular or binocular implementations, with arbitrary sharing of resources between the eyes for binocular systems.

FIG. 1 illustrates an example see-through AR (or XR) display system 100 (also referred to herein as "display system 100" or "display device 100") capable of implementing the pixelated dimming and digital passthrough techniques described herein. It should be understood that the apparatuses and techniques of the present disclosure are not limited to implementation in this particular display device but instead may be implemented in any of a variety of display systems/devices using the guidelines provided herein. In at least some embodiments, the display system 100 has a support structure 102 that includes an arm 104, which houses a laser projection system configured to project images toward the eye of a user, such that the user perceives the projected images as being displayed within a field-of-view (FOV) area 106 of a display at one or both of lens elements 108, 110. In the depicted example, the display system 100 is a wearable heads-up display (WHUD) that includes a support structure 102 configured to be worn on a user's head and has a general shape and appearance of an eyeglasses (e.g., sunglasses) frame.

The support structure 102 includes various components to facilitate the projection of such images toward the eye of the user, such as a laser projector, an optical scanner, and a waveguide. In at least some embodiments, the support structure 102 further includes various sensors, such as one or more front-facing cameras, rear-facing cameras, other light sensors, motion sensors, accelerometers, and the like. The support structure 102, in at least some embodiments, further includes one or more radio frequency (RF) interfaces or other wireless interfaces, such as a Bluetooth™ interface, a Wi-Fi interface, and the like. In at least some embodiments, the support structure 102 further includes one or more batteries or other portable power sources for supplying power to the electrical components of the display system 100. In some embodiments, some or all of these components of the display system 100 are fully or partially contained within an inner volume of support structure 102, such as within the arm 104 in region 112 of the support structure 102. It should be noted that while an example form factor is depicted, it will be appreciated that, in other embodiments, the display system 100 may have a different shape and appearance from the eyeglasses frame depicted in FIG. 1.

One or both of the lens elements 108, 110 are used by the display system 100 to provide an augmented reality (AR) display in which rendered graphical content can be superimposed over or otherwise provided in conjunction with a real-world view as perceived by the user through the lens elements 108, 110. For example, laser light used to form a perceptible image or series of images may be projected by a laser projector of the display system 100 onto the eye of the user via a series of optical elements, such as a waveguide formed at least partially in the corresponding lens element, one or more scan mirrors, and one or more optical relays. Thus, in at least some embodiments, one or both of the lens elements 108, 110 include at least a portion of a waveguide that routes display light received by an incoupler of the waveguide to an outcoupler of the waveguide, which outputs the display light toward an eye of a user of the display system 100. The display light is modulated and scanned onto the eye of the user such that the user perceives the display light as an image. In addition, each of the lens elements 108, 110 is sufficiently transparent to allow a user to see through the lens elements to provide a field of view of the user's real-world environment such that the image appears superimposed over at least a portion of the real-world environment.

In at least some embodiments, the projector is a digital light processing-based projector, a scanning laser projector, or any combination of a modulative light source such as a laser or one or more LEDs and a dynamic reflector mechanism such as one or more dynamic scanners or digital light processors. In at least some embodiments, the projector includes multiple laser diodes (e.g., a red laser diode, a green laser diode, a blue laser diode, or a combination thereof) and at least one scan mirror (e.g., two one-dimensional scan mirrors, which may be micro-electro-mechanical system (MEMS) based or piezo-based). The projector is communicatively coupled to the controller and a non-transitory processor-readable storage medium or memory storing processor-executable instructions and other data that, when executed by the controller, cause the controller to control the operation of the projector. In at least some embodiments, the controller controls a scan area size and scan area location for the projector and is communicatively coupled to a processor (not shown) that generates content to be displayed at the display system 100. The projector scans light over a variable area, designated the FOV area 106, of the display system 100. The scan area size corresponds to the size of the FOV area 106, and the scan area location corresponds to a region of one of the lens elements 108, 110 at which the FOV area 106 is visible to the user. Generally, a display should have a wide FOV to accommodate light outcoupling across a wide range of angles.

In at least some embodiments, the projector routes light via first and second scan mirrors, an optical relay disposed between the first and second scan mirrors, and a waveguide disposed at the output of the second scan mirror. In at least some embodiments, at least a portion of an outcoupler of the waveguide may overlap the FOV area 106.

Figure 2:
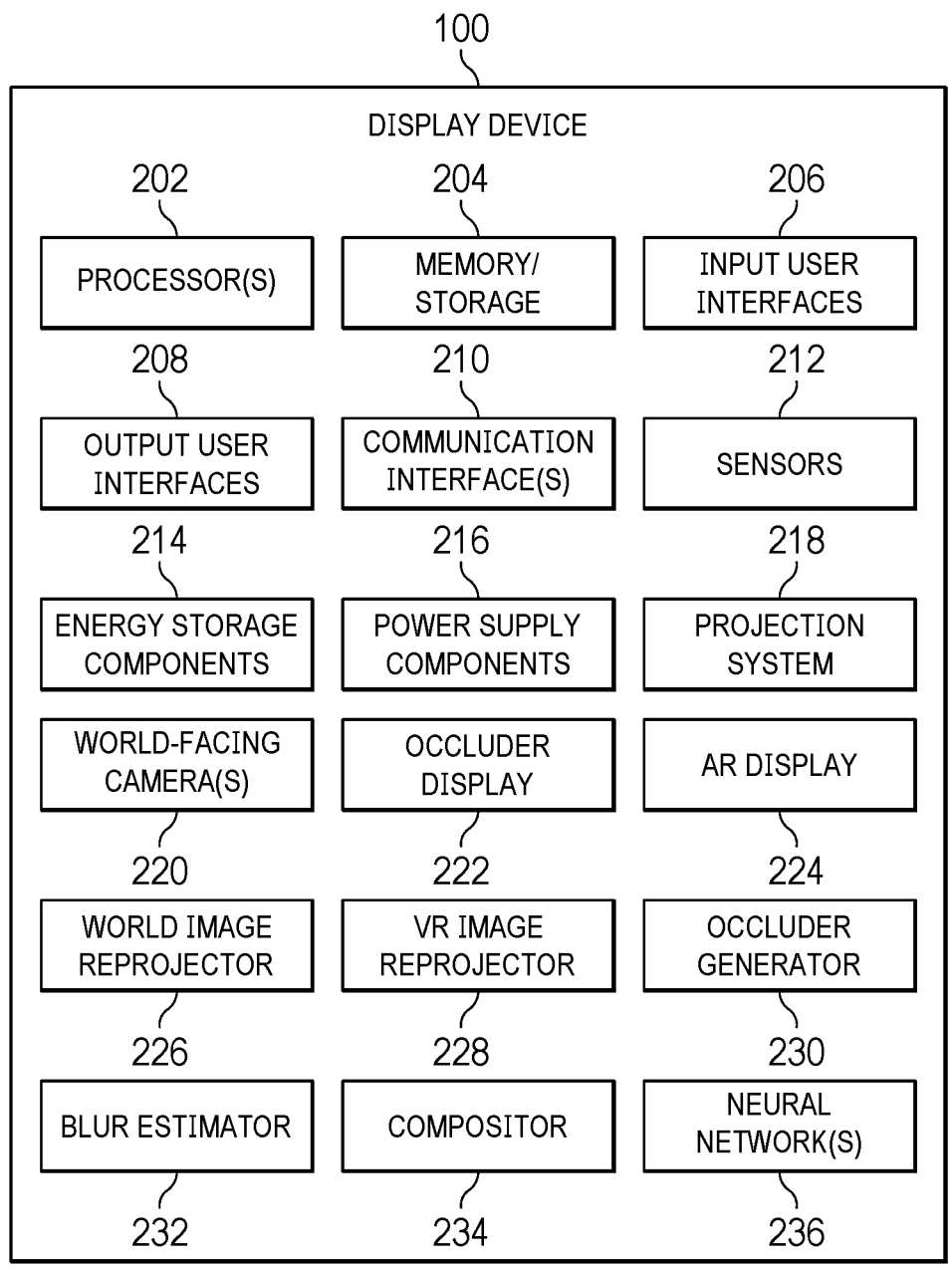
FIG. 2 is a block diagram illustrating an example of various components of the display system of FIG. 1 in accordance with some embodiments.
Figure 3:
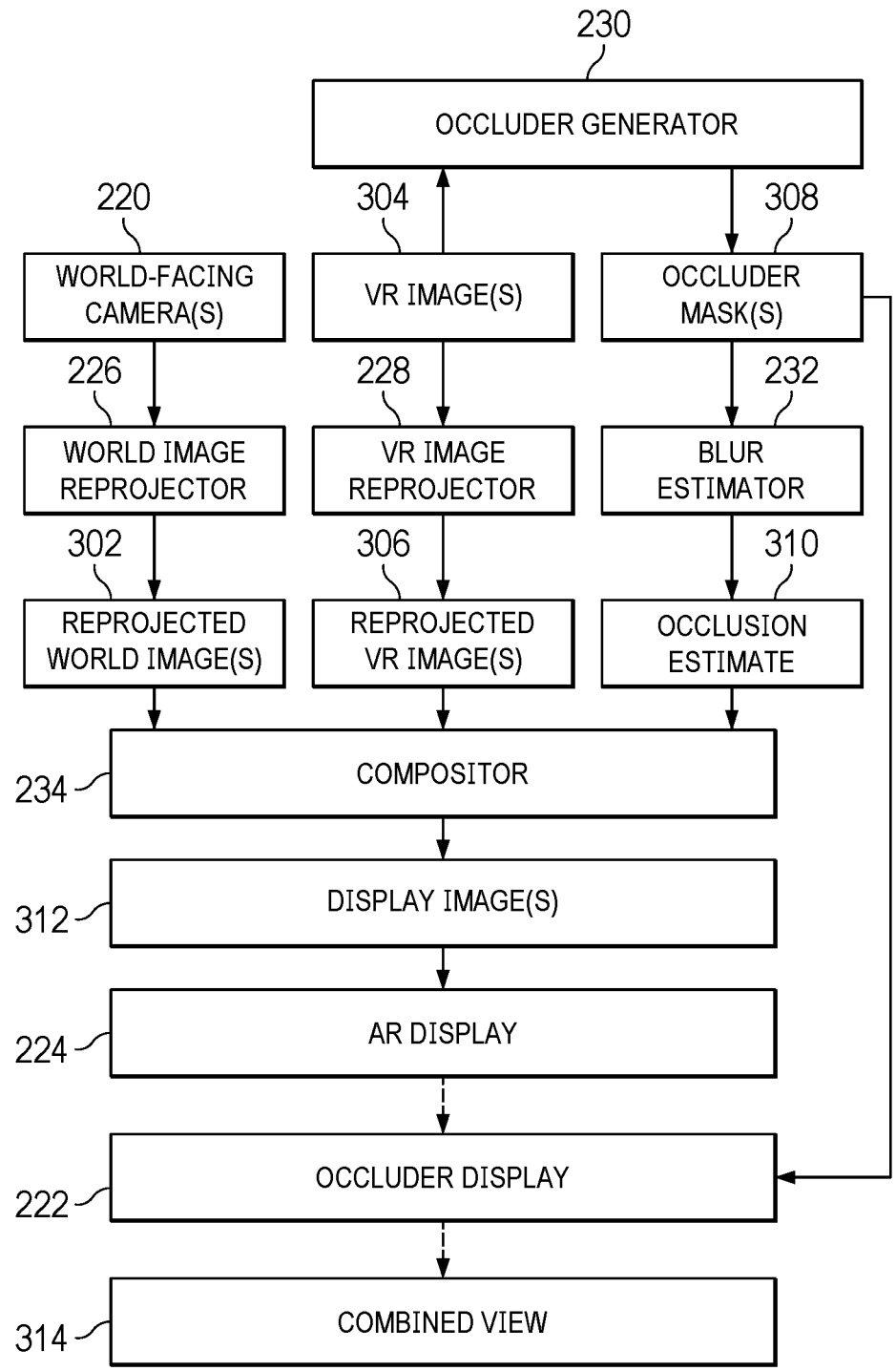
FIG. 3 is a block diagram illustrating another example of various components of the display device of FIG. 1 in accordance with some embodiments.

FIG. 2 and FIG. 3 are block diagrams illustrating various components of the display system 100. It is noted that the components of the display system 100 may differ in quantity, and in certain implementations, the configuration of the display system 100 may vary from what is depicted in FIG. 2 and FIG. 3. Furthermore, the display system 100, in some embodiments, incorporates components that are not illustrated in FIG. 2 and FIG. 3. In at least some embodiments, the display system 100 includes components such as one or more processors 202, memory/storage 204, input user interfaces 206, output user interfaces 208, communication interfaces 210, one or more sensors 212, energy storage components 214, power supply components 216, a projection system 218 and the like. The one or more processors, in at least some embodiments, include, for example, one or more central processing units (CPUs), graphics processing units (GPUs), accelerated processing units, machine-learning (ML) accelerators, tensor processing units (TPUs) or other application-specific integrated circuits (ASIC), a combination thereof, or the like.

The memory/storage 204, in at least some embodiments, includes one or more computer-readable media that include any of a variety of media used by electronic devices to store one or more of data or executable instructions, such as random access memory (RAM), read-only memory (ROM), caches, Flash memory, solid-state drive (SSD) or other mass-storage devices, and the like. For ease of illustration and brevity, the memory/storage 204 is referred to herein as "memory 204" in view of the frequent use of system memory or other memory to store data and instructions for execution by the processor(s) 202, but it will be understood that reference to "memory 204" shall apply equally to other types of storage media unless otherwise noted. The one or more memories 204 store one or more sets of executable software instructions and associated data that manipulate the processor(s) 202 and other components of the display system 100 to perform the various functions attributed to the display system 100. The sets of executable software instructions include, for example, an operating system (OS) and various drivers (not shown), and various software applications.

The input user interfaces, in at least some embodiments, include interfaces such as a microphone, a capacitive touch microcontroller, a push button controller, universal serial bus ports or other connectivity ports, or any other interface component that allows the user to provide an input to the display system 100. The output user interfaces, in at least some embodiments, include interfaces such as an audio interface, a haptic feedback interface, light emitting diodes (LEDs), universal serial bus ports or other connectivity ports, or any other interface component that provide conveys information to the user.

The communication interface(s) 210, in at least some embodiments, includes one or more radio frequency (RF) interfaces or other wireless interfaces, such as a Bluetooth™ interface, a Wi-Fi interface, Ethernet or other wired interfaces, a combination thereof, or any other communication interface that allows the display system 100 to communication with a network(s) or other devices. The sensors 212, in at least some embodiments, include light sensors, motion sensors, gyroscopes, accelerometers, a combination thereof, or the like. The energy storage components 214, in at least some embodiments, store electrical energy for use by the display system 100. In at least some embodiments, the energy storage components 214 include one or more batteries, battery chargers, a combination thereof, or the like. The power supply components 216 manage the distribution and regulation of power within the display system 100. In at least some embodiments, the power supply components 216 include charging ports, voltage regulators, battery management systems, direct-current-to-direct-current converters, capacitors and inductors, a combination thereof, or the like. The projection system 218 converts a generated digital image to light. Examples of the projection system 218 include a laser projection system, a microLED projection system, a MEMs mirror-based projector system, and the like.

The display system 100, in at least some embodiments, is a hybrid passthrough AR (or XR) display device. As such, the display system 100 further includes one or more world-facing cameras 220, an occluder display 222, and an AR display 224. In at least some embodiments, the display system 100 also includes one or more user-facing cameras (not shown). The world-facing camera 220 captures live images of the user's environment. The occluder display 222 is a see-through spatially-structured (segmented or pixelated) world-dimming display that integrates virtual objects into the physical environment by blocking out parts of the real world behind virtual objects. The AR display 224 is a see-through (additive) display that superimposes digital information or graphics directly onto the user's natural view of the physical world. In at least some embodiments, one or more of the occluder display 222 or the AR display 224 is a rolling-illumination display (e.g., a micro light emitting diode (μLED) display, an organic LED (OLED) display, a mini-LED backlit liquid crystal display (LCD), or the like), that provides lower latency than other display types. However, other display types are applicable as well.

The display system 100 further includes one or more of a world image reprojector 226, a VR image reprojector 228, an occluder generator 230, a blur estimator 232, a compositor 234, a neural network(s) 236, a combination thereof, or the like. In at least some embodiments, one or more of these components are implemented using a hardware component (s), circuitry, firmware or a firmware-controlled microcontroller, or a combination thereof. It should be understood that although these components are depicted as being separate from the processor 202, in at least some embodiments, one or more of these components are implemented as part of the processor 202 or another processing device. Also, one or more of these components, in at least some embodiments, are formed and combined with the processor 202, another processing device(s), the occluder display 222, the AR display 224, or a combination thereof on a single silicon die or package, or are formed separately and mounted on the same or different substrates.

As depicted in the example shown in FIG. 3, the world image reprojector 226 processes images of the user's physical environment, captured by the world-facing camera 220, to adjust and reposition these images so they align correctly with the real world as seen from the user's eye. The resulting image 302 is referred to herein as a "reprojected world image 302" or a "world image 302". The VR image reprojector 228 processes VR images 304 that the AR display 224 overlays on the user's real-world view to, for example, correct for the difference between a predicted position of the user's eye for which the image 304 was rendered and the actual position of the eye when the image 304 is being displayed. The resulting image(s) 306 is referred to herein as a "reprojected VR image 306". The occluder generator 230 generates an occluder image 308 (also referred to herein as an "occluder mask 308") for display by the occluder display 222 so that corresponding areas in the user's real-world view are sufficiently dimmed to the user's eye. The blur estimator 232 takes the occluder mask 308 as input and generates an estimate 310 (herein referred to as an "occlusion estimate 310") of the user's blurred view of the occluder display 222 based on this input. This estimate 310 is herein referred to as an "occlusion estimate 310" or an "estimated occlusion image 310". The compositor 234 takes as input the reprojected world image(s) 302, the reprojected VR image 306, and the occlusion estimate 3 generates a composited display image 312 (also referred to as the "display image 312") to be presented by the AR display 224. As the user looks through the AR display 224 and occluder display 222, the user is presented with a combined view 314 composed of the composited display image 312 and the view of the physical environment occluded by the occluder mask 308. In at least some embodiments, one or more of the neural networks 236, which are computational models, are implemented by at least one of the reprojector 226, VR image reprojector 228, occluder generator 230, blur estimator 232, or compositor 234 to perform one or more of the processes or operations described herein.

Figure 4:
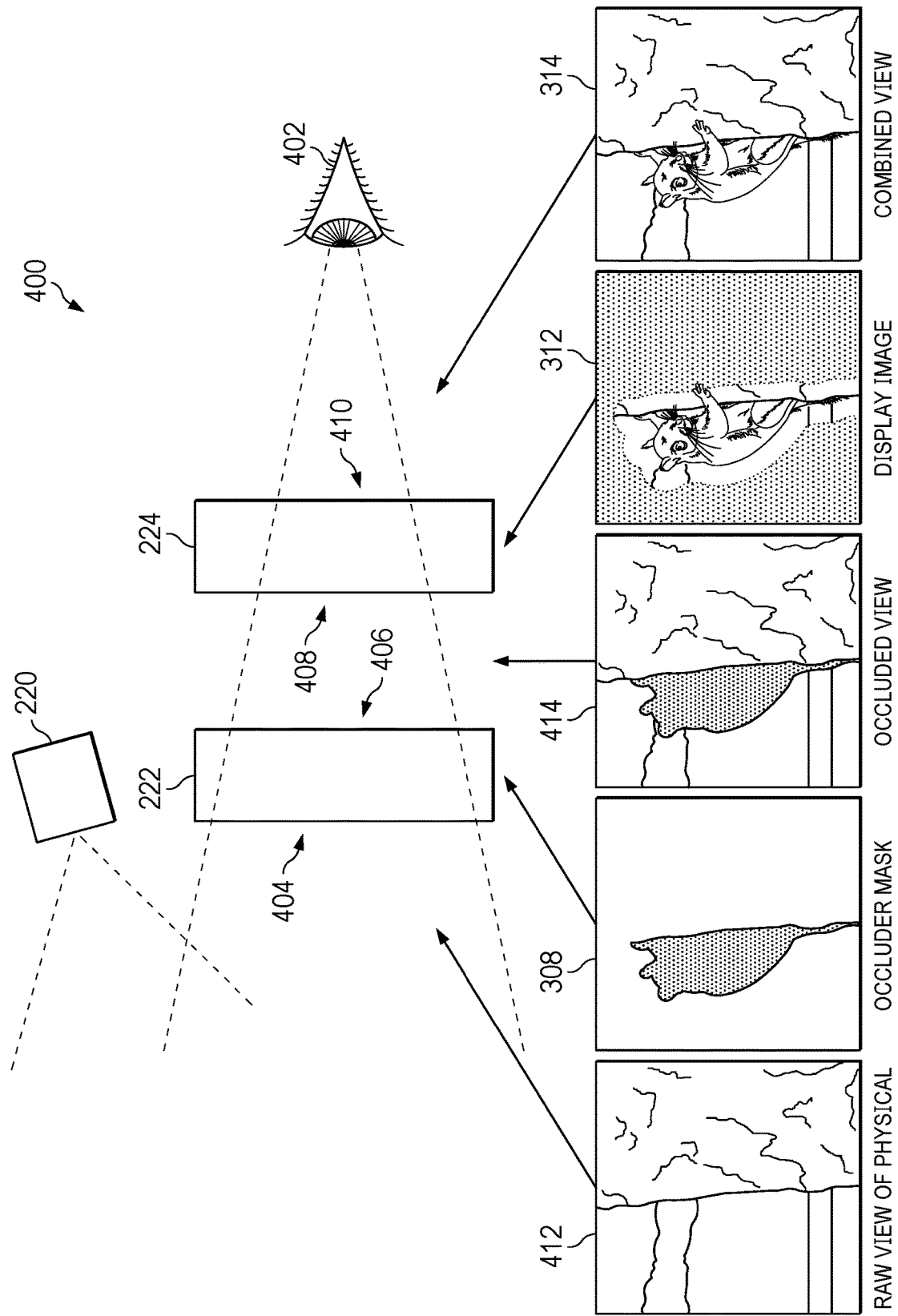
FIG. 4 is a diagram illustrating a side view of an example mechanical arrangement of various components of the display system of FIG. 1 in accordance with some embodiments.

FIG. 4 illustrates a side view of an example mechanical arrangement 400 of the world-facing camera(s) 220, occluder display 222, and AR display 224. The arrangement/orientation of these components is described with reference to the display system 100 being worn by the user. It should be understood that the following description applies to monocular and binocular configurations of the display system 100. For example, in a monocular configuration, a world camera(s) 220, an occluder display 222, and an AR display 224 are implemented for one of the user's eyes, whereas in a binocular configuration, a world camera(s) 220, an occluder display 222, and an AR display 224 are implemented for each of the user's eyes.

In the example depicted in FIG. 4, the AR display 224 is situated between the occluder display 222 and the user's eye 402. The world camera(s) 220 is situated above the occluder display 222 and the AR display 224, with its lens (not shown) facing the world-view of the user. However, it should be understood that the world camera(s) 220 is not limited to being positioned above the occluder display 222 and the AR display 224, and other arrangements are applicable as well. The occluder display 222 includes a world-facing side 404 and an eye-facing side 406. The AR display 224 includes a world-facing side 408 situated opposite the eye-facing side 406 of the occluder display 222 and an eye-side 410 situated opposite the user's eye 402. As indicated above, the occluder display 222 creates an occluded view 414 of the physical environment for the user. For example, the occluder display 222 occludes a raw view 412 of the physical environment by displaying the occluder mask 308, resulting in an occluded view 414 of the physical environment being presented to the user. The AR display 224 presents the composited display image 312 to the user. As such, the resulting view presented to the user through the AR display 224, and the occluder display 222 is a combined view 314 of the composited display image 320 and the occluded view 414.

Figure 5:
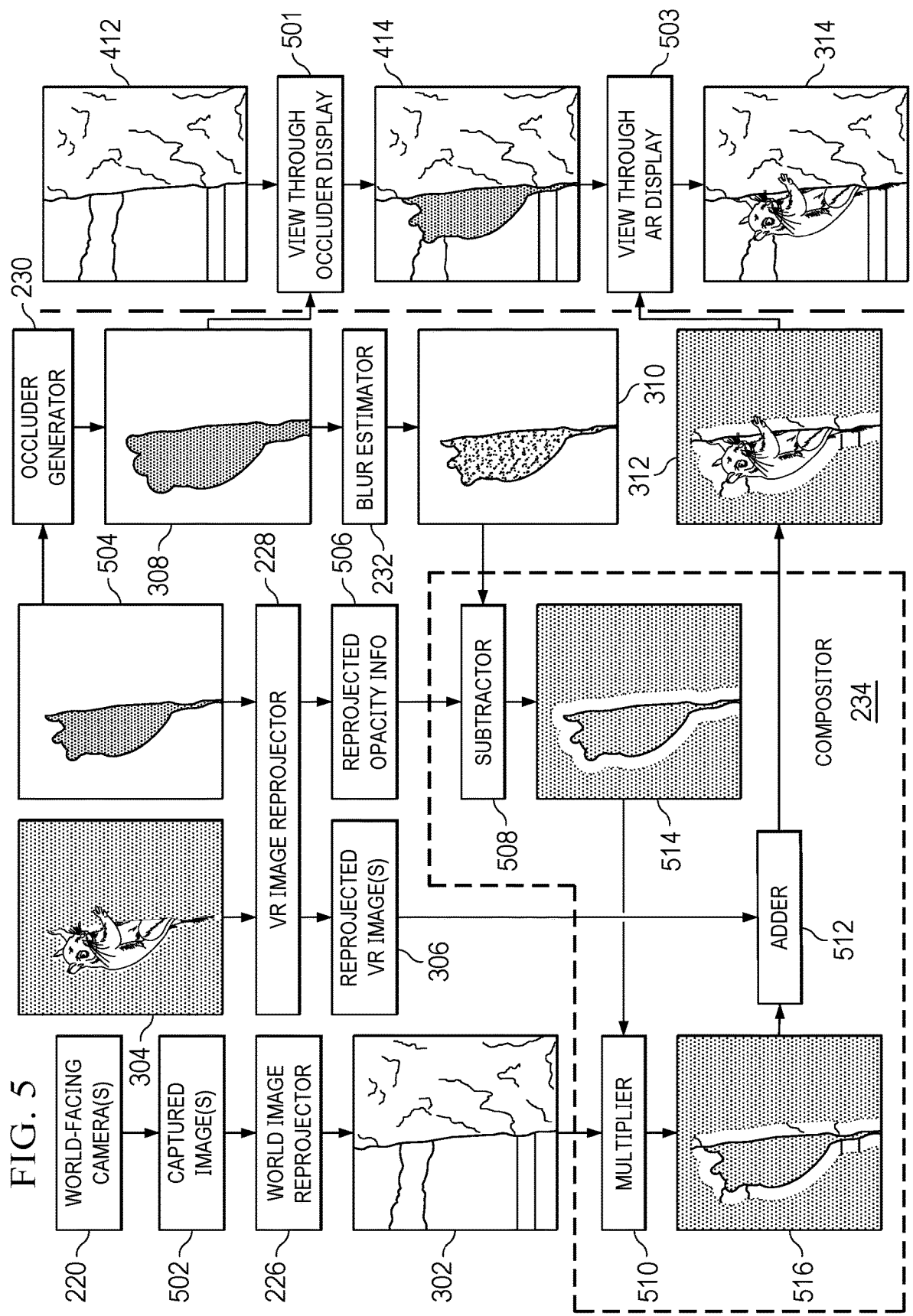
FIG. 5 is a diagram illustrating one example of data flow between the components of the display system of FIG. 1 for performing pixelated dimming and digital passthrough techniques in accordance with some embodiments.

FIG. 5 is a diagram illustrating one example of data flow between the components of the display system 100 for performing pixelated dimming and digital passthrough techniques. FIG. 5 further illustrates the different views of the physical environment presented to the user through the occluder display 222 and the AR display 224. In at least some embodiments, the processes described below are performed in a scanline-raced fashion with the world-facing camera(s) 220, the world image reprojector 226, the VR image reprojector 228, the occluder generator 230, the blur estimator 232, the compositor 234, the occluder display 222, and the AR display 224 running executing in lock-step with minimal buffers between them.

The world-facing camera(s) 220 captures one or more images 502, such as real-time images or video, of the physical environment. In at least some embodiments, the world-facing camera(s) 220 captures these images 502 off-axis to the user's perspective of the physical environment. Therefore, in these embodiments, the world image reprojector 226 estimates the view of the physical environment from the user's perspective and performs a reprojection process on the captured images 502. The reprojection process performs one or more operations that adjust and reposition the captured image 502. The reprojection process results in a reprojected world image 302 that correctly aligns with the real world as seen from the user's perspective.

In at least some embodiments, the reprojection process includes one or more of image analysis, user perspective and position calculation, and reprojection calculation. During image analysis, the world image reprojector 226 performs operations such as distortion correction, color and brightness adjustment, image stabilization, a combination thereof, or the like. For example, camera lenses often distort images, particularly at the edges. Therefore, in at least some embodiments, the world image reprojector 226 applies one or more algorithms to correct these distortions, ensuring that straight lines in the real world appear straight in the captured image 502. The world image reprojector 226, in at least some embodiments, adjusts the color balance, contrast, and brightness of the capture image 502 to match the user's natural perception and correct chromatic aberrations. Image stabilization techniques, in at least some embodiments, are performed by the world image reprojector 226 to counteract any shakiness or movement from the user's head or the display system 100 itself.

The world image reprojector 226, in at least some embodiments, calculates the user perspective and position using or more techniques, such as head tracking, eye tracking, a combination thereof, or the like. For example, in at least some embodiments, the world image reprojector 226 uses data from one or more sensors 212, such as a gyroscope or an accelerometer, to track the orientation and position of the user's head. The orientation and position of the user's head include, for example, three degrees of freedom (3DOF) information, six degrees of freedom information (6DOF), or the like. 3DOF information includes rotational movement information, such as yaw (turning left or right), pitch (looking up or down), and roll (tiling side to side). 6DOF information includes translation movement information, such as surge (forward/backward), sway (left/right), and heave (up/down), in addition to rotational movement information.

Eye tracking, in at least some embodiments, is performed using, for example, cameras, sensors, infrared illuminations, a combination thereof, or the like. These components capture detailed information about the eye's movements and positions. Examples of eye movement data include gaze direction and pupil dilation. Gaze direction refers to the direction in which the eyes are gazing. In at least some embodiments, world image reprojector 226 determines gaze direction by tracking the position of the pupil and the reflection pattern on the cornea. However, other techniques for determining gaze direction are applicable as well. The world image reprojector 226, in at least some embodiments, determines pupil dilation by measuring the diameter of the pupil. However, other techniques for determining or estimating pupil dilation are also applicable. For example, in at least some embodiments, the world image reprojector 226 estimates pupil dilation based on scene brightness taken either from an ambient light sensor(s) or the world-facing camera(s) 220. Gaze direction, in at least some embodiments, is used by the world image reprojector 226 to select between ambient light sensors or select a region of the capture image 502 to consider. In at least some embodiments, one or more of the head-tracking or eye-tracking techniques described herein are performed by a different or dedicated component of the display system 100 other than the world image reprojector 226

In at least some embodiments, the world image reprojector 226 performs the reprojection calculation on the captured image 502 to adjust the captured image 502 to match the user's perspective. For example, the world image reprojector 226 performs one or more of a geometric transformation process, a depth perception integration process, a perspective alignment process, a view frustum adjustment process, a combination therefore, other image-space shift (x/y translation) processes, other depth-aware (e.g., 3DOF or 6DOF) reprojection processes, a combination thereof, or the like. During a geometric transformation process, the world image reprojector 226 applies geometric transformations to the captured image 502, such as warping or reshaping parts of the image so that, when viewed, they align with the user's current perspective. As part of the depth perception integration process, the world image reprojector 226 calculates the depth information for various objects in the scene to understand which objects are closer or farther away from the user. The image reprojector 226 uses the perspective alignment process to adjust the transformed captured image 502 so that it aligns with the user's current viewpoint and the image displayed to the user matches what they would see if they were looking directly at the scene, without the display system 100. During the view frustum adjustment process, the image reprojector 226 adjusts the view frustum, which is the region of space in the modeled world that may appear on the screen, to ensure that the field of view in the reprojected image matches the user's natural field of view. The resulting output of the image reprojector 226 is a reprojected image 302 that is a realistic, perspective-corrected view of the real world. As described below, the compositor 234 uses the reprojected image 302 as one of its inputs.

In addition to the captured image 502, the display system 100 also obtains one or more virtual images 304 from a virtual image source, such as an application, a rendering system, a playback system, an external interface, a combination thereof, or the like. The virtual image 304 is a digitally created entity or object that is to be superimposed onto the real-world environment by the AR display 224. In at least some embodiments, the display system 100 obtains opacity information 504 (also referred to herein as an "opacity image 504") in addition to the VR image 304. The opacity information 504, in at least some embodiments, indicates the degree to which the VR image 304 or one or more portions thereof is transparent or opaque. Stated differently, the opacity information 504 is a depiction of where virtual objects within the VR image 304 obstruct the view of the real environment. For example, the opacity information 504 assigns an opacity value to each pixel of the VR image 304 or portions thereof. In at least some embodiments, the virtual image source provides the opacity information 504 for the VR image 304. In other embodiments, the opacity information 504 is embedded within the VR image 304 through one or more techniques, such as chroma-keying, or communicated independently as an alpha channel.

The virtual image 304 and any associated opacity information 504 are provided to the VR image reprojector 228. The VR image reprojector 228 performs one or more reprojection processes, such as those described above with respect to the world image reprojector 226, on the virtual image 304 and opacity information 504 (e.g., opacity image or alpha mask). The reprojection process results in a reprojected VR image 306 and reprojected opacity information 506 (also referred to herein as a "reprojected opacity image 506") that correctly aligns with the real world as seen from the user's perspective. As described below, the compositor 234 uses the reprojected VR image 306 and reprojected opacity information 506 as inputs.

In at least some embodiments, the opacity information 504 is provided to the occluder generator 230 as an input. The occluder generator 230 processes the opacity information 504 to generate or adjust an occluder mask 308, which is a digital representation of where virtual objects will be hidden or partially obscured by physical objects. In at least some embodiments, the occluder generator 230 adjusts the occluder mask 308 such that, when blurred due to the eye's proximity to the occluder display 222, the relevant areas of the view of the real world are sufficiently dimmed to the user's eye. FIG. 5 shows an example of a non-occluded view, such as raw view 41,2 of the physical environment and a view 501 through the occluder display 222 after displaying the occluder mask 308, resulting in an occluded view 414 of the physical environment. As shown, the occluder mask 308 obstructs a portion of the user's view of the physical/real environment corresponding to the virtual object in virtual image 304.

In at least some embodiments, the occluder generator 230 analyzes the opacity information 504 to generate the occluder mask 308. The opacity information 504 includes, for example, opacity values, such as a value of 0 indicating a pixel is completely transparent, a value of 1 indicating a pixel is completely opaque, and fractional values representing varying degrees of transparency. In at least some embodiments, the occluder generator 230 marks pixels having a value of 1 (or near 1 based on a threshold) as occluders, which indicates that these pixels will completely block the real-world view behind them. The occluder generator 230 marks pixels having lower values (below the threshold) as non-occluders, which indicates that these pixels allow the real-world view to show through. In other embodiments, the occluder generator 230 translates the full range of opacity values into a grayscale image. In these embodiments, darker shades represent areas of greater opacity (stronger occlusion) and lighter shades represent areas of lesser opacity (weaker occlusion).

In at least some embodiments, the occluder generator 230 considers the field-of-view (FOV) limitations of the occluder display 222 and the AR display 224 when generating the occluder mask 308. For example, the image of the AR display 224 typically has a smaller FOV compared to the occluder display 222, which in turn is smaller than the user's natural FOV when looking through the optics of the AR display 224. The occluder generator 230 considers these limits to ensure that the virtual elements are correctly aligned and scaled within the user's visual field.

In at least some embodiments, the occluder generator 230 selectively generates an occluder mask 308. For example, the occluder generator 230 takes into account one or more of the pixel intensity, pixel color, or a structure(s) present in the reprojected world image 302 (or captured image 502), the reprojected VR image 306 (or original VR image 304), or a combination thereof. Based on these characteristics, the occluder generator 230 determines if an occluder mask 308 should be generated. For instance, consider a scenario where the world image 302 displays a dark, flat area while the corresponding area in the VR image 304 is bright. In such a case, the occluder generator 230 determines that an occluder mask 308 is unnecessary because the bright virtual elements naturally dominate the visual field in contrast to the darker real-world background, thereby reducing the need for occlusion. In other embodiments, instead of performing image processing on the opacity information 504 of the VR image 304 to generate the occluder mask 308, the VR image source directly provides the occluder mask 308 in addition to the opacity information 504.

If only very large virtual objects (e.g., virtual objects with a dimension greater than a threshold) without thin structures (e.g., wireless, poles, thin walls, detailed ornamentations, etc.) are being displayed, the occluder generator 230, in at least some embodiments, directly uses the alpha channel of the virtual image 304 as the occluder mask 308. For simple VR content (e.g., a virtual monitor), the occluder generator 230 generates an occluder mask 308, such as a blocking object, that is rendered into the opacity layer of the VR image 304 that is larger than the VR image 304 to ensure the background behind the displayed VR content is more fully occluded.

In at least some embodiments where the VR image source comprises a rendering system, the VR image source is able to directly compute the occluder mask 308 as a separate rendering pass. In these embodiments, vertex shader techniques, such as those similar to those used to create edge strokes in toon-shaded rendering, are used to expand the geometry of rendered objects, creating a margin between the visual extents of the object and the generated occlusion. This additional margin acts as a buffer zone, effectively reducing the likelihood of the real-world view blending into the edges of the virtual objects. The extra margin ensures that the edges of virtual objects remain distinct and clear against the varying backgrounds of the real world.

The occluder generator 230, in at least some embodiments, applies morphological dilation to the opacity information 504 (opacity image) to generate the occluder mask 308. Applying a morphological dilation to the opacity information 504 enhances how virtual objects occlude the real world. In this context, the opacity information 504 is an opacity image or map indicating the transparency levels of each pixel of the virtual image 304, with the opaque regions representing areas that completely block the real-world view. The occluder generator 230 uses morphological dilation to expand these opaque areas within the resulting occluder mask 308. For example, the occluder generator 230 moves a structuring element, such as a small square or circle, across the opacity image and enlarges the opaque regions by converting adjacent semi-transparent or transparent pixels to opaque. As such, the resulting occluder mask 308 provides more effective occlusion. By expanding the opaque areas, the occluder mask 308 more robustly prevents the real world from being seen through the virtual image 304. In at least some embodiments, the dilation radius is based on the user's pupil diameter. The occluder generator 230 (or another component) determines the pupil diameter using one or more techniques, such as those described above with respect to the world image reprojector 226. In at least some embodiments, the occluder generator 230 also uses pupil diameter and center location to shift the resulting occluder mask 308 to be correct relative to the user's pupil.

In at least some embodiments where the VR image source comprises a rendering system, the VR image source is able to directly compute the occluder mask 308 as a separate rendering pass. In these embodiments, vertex shader techniques, such as those similar to techniques used to create edge strokes in toon-shaded rendering, are used to expand the geometry of rendered objects, creating a margin between the visual extents of the object and the generated occlusion. This additional margin acts as a buffer zone, effectively reducing the likelihood of the real-world view blending into the edges of the virtual objects. The extra margin ensures that the edges of virtual objects remain distinct and clear against the varying backgrounds of the real world.

The occluder generator 230, in at least some embodiments, implements an iterative, error-minimizing process to refine the occluder mask 308. One objective of the iterative process is to minimize an error metric, such as a quantitative measure of the deviation between a computed blurred occluded view (e.g., the occlusion estimate 310 described below) and desired opacity levels. For example, an initial estimated view of how the virtual image 304 obscures (occludes) and blurs the real-world scene is generated. In at least some embodiments, this process factors in depth-of-field and focus blur. The estimated view is then compared against the desired opacity values for various elements within the scene, assessing the accuracy of occlusion and blurring effects. The error metric quantifies the discrepancies observed in this comparison. Subsequent iterations involve adjusting the occluding and blurring parameters of the occluder mask 308 based on the feedback from the error metric evaluation. Each iteration aims to bring the occluding and blurring effects of the occluder mask 308 closer to the desired opacity outcomes. The iterative cycle continues until the occlusion and blurring effects of the occluder mask 308 align closely with the targeted opacity levels, as indicated by a minimized error metric. At this point, the process concludes.

The computational load of the iterative error-minimizing process, in at least some embodiments, is reduced by using the previous frame's occluder mask 308 and estimated occlusion 310 as inputs. By reusing the data processed in the previous frame, the occluder generator 230 avoids the need to recalculate the entire scene from scratch, which can be computationally intensive. Instead, the occluder generator 230 adapts this data based on the latest motion tracking input, accommodating any changes in the user's perspective or in the scene's dynamics. Such adaptations include, for example, warping (e.g., shifting, rotating, scaling, etc.) the previous frame's results to align with new viewpoints or adjusting it to reflect any movement within the scene. This method of iteratively updating the scene using modified previous results enhances computational efficiency as each iteration becomes less about extensive recomputation and more about targeted adjustments.

In at least some embodiments, instead of (or in addition to) performing the iterative error-minimizing technique described above for refining or generating the occluder mask 308, the occluder generator 230 implements one or more machine learning (ML) techniques using at least one of the neural networks 236 to generate the occluder mask 308. For example, an offline process, which is not limited by real-time computational constraints (computationally unbounded), is employed to generate a comprehensive dataset. This dataset includes a large number of pairs, each containing opacity information 504, such as an opacity image (representing various real-world and virtual object scenarios) and its corresponding optimal occluder mask image (the ideal outcome for occlusion in each scenario). Once this dataset is established, at least one of the neural networks 236 is trained using this data. One objective of the training is to enable the neural network 236 to learn the complex relationships between the opacity images and their respective optimal occluder masks. Through this learning process, the neural network 236 develops the ability to predict or approximate the most effective occluder mask 308 for any given opacity image, based on the patterns it has recognized in the training data, while using a fixed amount of compute resources each frame. The occluder generator 230 implements a trained neural network 236 to rapidly generate occluder masks 308 from incoming opacity information 504, bypassing the need for iterative refinement. This method significantly reduces the computational load during real-time operations, as the heavy-lifting part of generating the training data and training the neural network 236 is done offline.

The occluder mask 308 generated or obtained by the occluder generator 230 is used by the blur estimator 232 as an input to generate an occlusion estimate 310 of the user's blurred view of the occluder display 222. In at least some embodiments, the blur estimator 232 generates or determines the occlusion estimate 310 by, for example, applying one or more blurring effects to the occluder mask 308 to soften and diffuse the edges of occlusion areas. In one example, the blur estimator 232 applies an approximation of disc blur, such as a real-time focal ("bokeh") blur, to the occluder mask 308. The disc blur effect simulates how the occluder mask 308 behaves when out of focus, creating a more accurate estimation of the resulting occluded view of the real world. However, other techniques for applying a blurring effect are applicable as well. In at least some embodiments, the occlusion estimate 310 further refines this process by modeling the display panel's actual response to the occluder mask 308. This encompasses considerations such as the display's contrast levels and response time, ensuring that the estimated occluded view closely mimics the real-world result. In at least some embodiments, the modeling includes assessing the contrast levels as affected by the occluder mask in relation to the real-world view and determining the response time of each pixel or segment of the occluder display 222 to dynamic changes in the occluder mask 308.

In at least some embodiments, the blur estimator 232 uses eye-tracking data to determine the occlusion estimate 310. The blur estimator 232 (or another component) obtains the eye-tracking data using one or more techniques, such as those described above with respect to the world image reprojector 226. The eye tracking data allows for the adjustment of the blur size based on the user's pupil size, which varies with light conditions, the user's age, and other factors. In at least some embodiments, the adjustment of the blur size is correlated to changes in the pupil size of the user. Furthermore, by using the eye tracking data, the blur estimator 232 is able to account for the motion of the pupil between the computation and the display of the occluder image when determining the occlusion estimate 310, ensuring that the occlusion effect remains consistent with the user's current visual focus and perspective. In at least some embodiments, the blur estimator 232 also uses pupil diameter and center location to shift the resulting occlusion estimate 310 to be correct relative to the user's pupil. The blur estimator 232, in at least some embodiments, further takes into account the accommodation distance of the user. For example, when focused close to the face, the occluder mask 308 appears less blurred than when focused at a distant target. The blur estimator 232, in at least some embodiments, determines or estimates the focus distance from the vergence distance, which is estimated from the per-eye gaze direction.

In at least some embodiments, if the display system 100 implements an ML-based approach for generating an occluder mask 308, a neural network 236 is trained to generate not only an occluder mask 308 but also an occlusion estimate 310 of the blurred view of the occluder, all within a single processing pass. For example, a neural network 236 is trained on a dataset comprising various scenarios, each featuring different occlusion and blurring conditions. The training process enables the neural network 236 to understand and learn the complex interplay between the elements of the scene that contribute to occlusion and the appropriate level of blur that should be applied to each occluder, depending on its depth, position, and other contextual factors. Once trained, the neural network 236 receives input in the form of, for example, scene data and rapidly outputs both the occluder mask 308 and the corresponding occlusion estimate 310 of the blurred occluder view. By consolidating these two processes into a single pass, the separate blurring process is not needed, thereby streamlining the workflow and reducing the computational burden.

In at least some embodiments, the blur estimator 232 streamlines the occlusion estimation process (and occluder mask generation process) by targeting a specific blur size in pixels. In these embodiments, input opacity information 504 (e.g., opacity images) and output occluder display images (e.g., occluder masks 308) are scaled accordingly. The scaling facilitates the use of algorithms optimized for particular blur sizes, enhancing computational efficiency. Also, by setting a standard pixel size for the blur effect, a neural network 236 is able to be trained more effectively, leading to quicker and more accurate generation of occluder masks 308 and their corresponding occlusion estimates 310 (e.g., blurred views).

The compositor 234, in at least some embodiments, takes as input, for example, the reprojected world image 226 (or captured image 502), the reprojected VR image 306 (or VR image 304), and the occlusion estimate 310 to generate a display image 312 to be output by the AR display 224. For example, in at least some embodiments, the compositor 234 includes a subtractor 508, a multiplier 510, and an adder 512. The subtractor 508 takes the estimated occlusion image 310 and subtracts the opacity from it. This process results in an image referred to herein as an "unwanted occlusion image 514" or an "undesired occlusion image 514". The estimated occlusion image 310 approximates areas where light from the real world is being blocked, while the opacity image 506 shows the desired amount of light to be blocked. By subtracting the latter from the former, the unwanted occlusion image 514 highlights areas where occlusion is happening but is not required or desired. In at least some embodiments, the estimated occlusion image 310 identifies discrepancies between intended and actual occlusion.

The multiplier 510 takes the reprojected world image 226 (or captured image 502) and multiples it by the unwanted occlusion image 514. This operation results in a masked world image 516. In areas where the unwanted occlusion is high, the result is a bright version of the reprojected world image 302, while in areas where it is near zero, the result is black. The adder 512 sums the masked world image 516 with the color components of the reprojected VR image 306 (or original VR image 304) to create the final display image 312 to be presented to the user by the AR display 224. The display image 312, in at least some embodiments, combines the color and detail of the virtual image 304 with portions of the view of the real world, filling in and, thus, mitigating regions of excessive occlusion.

The display image 312 is presented to the user by the AR display 224. When the user looks through the AR display 224, the user observes the display image 312 superimposed or overlaid on the user's view of the physical environment. The user is also viewing the physical environment through the occluder display 222, which is displaying the occluder mask 308 and is positioned at least partially between the physical environment and the AR display 224. As described above, the occluder mask 308 blocks out part of the physical environment behind and, in some instances, surrounds the display image 312. Therefore, the display image 312 appears to be a solid object within the physical environment. As a result of the techniques described herein, artifacts such as dark borders, halos, or clouds that typically form around virtual objects rendered by a conventional see-through AR display with a segmented or pixelated dimmer are removed. For example, FIG. 5 shows an example of the view 503 through the AR display 224 when the occluder image 308 is being displayed by the occluder display 222 and the display image 312 is being displayed by the AR display 224 resulting in a combined view 314 of the occluder mask 308 and display image 312. As shown, the virtual object of the display image 312 is displayed as a solid object without any of the typical artifacts typically found with conventional see-through AR displays.

In some instances, the process of subtracting the reprojected opacity image 506 (or the original opacity image 504) from the estimated occlusion image 310 to produce the unwanted occlusion image 514 may produce negative values. These negative values indicate areas of under-occlusion, where the occlusion is less than what was intended. Therefore, in at least some embodiments, the compositor 234 clamps these values to zero, simplifying the process. However, allowing these values to propagate through the subsequent processing steps can offer certain advantages. If not clamped, these negative values, in at least some instances, result in a corresponding negative color during the masked world image 516 generation process, leading to a dimming effect on the display image 312. While displays cannot produce negative light (i.e., the negative values should be clamped to 0 at this stage), allowing under-occlusion to propagate can enhance the overall experience by providing cleaner edges between the virtual objects and the real world, particularly in areas with under-occluded edges.

The compositor 234, in at least some embodiments, uses a blurred version of the reprojected world image 302 (or the captured image 502) when computing the masked world image 516 to mitigate the impact of double images, especially in areas with low undesired occlusion. This technique helps blend the real and virtual elements more smoothly, enhancing the visual coherence of the scene. Also, in at least some embodiments, the various reprojection processes described above are performed using gamma-curved (non-linear) colors, whereas the masking and compositing processes are performed using a linear color space.

As described above, in at least some embodiments, the compositor 234 takes as input the reprojected world image 302 and the reprojected opacity image 506 along with the occlusion estimate image 310. In at least some embodiments, the reprojection operations performed on the captured image 502 and the opacity image 504 to generate the reprojected world image 302 and the reprojected opacity image 506, respectively, are late-state reprojection operations. For example, in at least some embodiments, the reprojections and compositing processes run as a single pass. In these embodiments, the latest motion tracking data, including gyroscopic data, is used to predict head orientation at the time the display image 312 is to be displayed when performing the reprojection operations. Also, in at least some embodiments, a rotational (e.g., 3DOF) reprojection of the VR image 304 is performed to correct for any head motion between the rendering of the display image 312 and the actual time when light reaches the eye. In addition, the compositor 234, in at least some embodiments, uses updated eye tracking data to adjust the estimated occlusion image 310, compensating for eye motion between its computation and use in computing the unwanted occlusion image 514.

Figure 6:
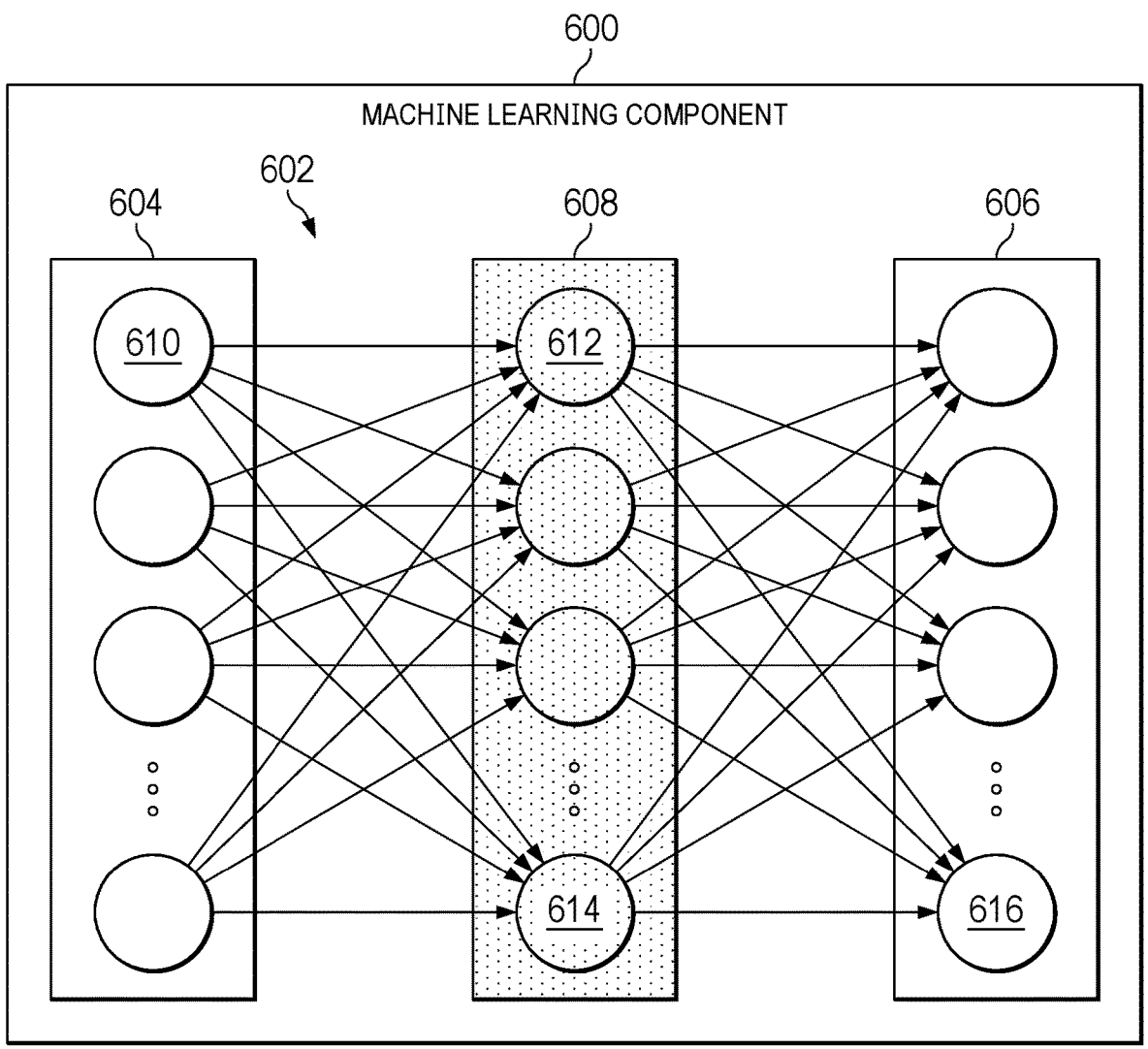
FIG. 6 is a diagram illustrating a machine learning (ML) module employing a neural network for implementation by the display system 100 of FIG. 1 in accordance with some embodiments.

FIG. 6 shows one example of an ML component 600 implemented by the display system 100 as a standalone component or implemented by one or more of the world image reprojector 226, the VR image reprojector 228, the occluder generator 230, the blur estimator 232, or the compositor 234 to perform the operations and processes described above. In the depicted example, the ML component 600 implements at least neural network 236, such as a deep neural network (DNN) or another type of neural network, with groups of connected nodes (e.g., neurons and/or perceptrons) organized into three or more layers. The nodes between layers are configurable in a variety of ways, such as a partially connected configuration where a first subset of nodes in a first layer is connected with a second subset of nodes in a second layer, a fully connected configuration where each node in a first layer is connected to each node in a second layer, etc. A neuron processes input data to produce a continuous output value, such as any real number between 0 and 1. In some cases, the output value indicates how close the input data is to a desired category. A perceptron performs linear classifications on the input data, such as a binary classification. The nodes, whether neurons or perceptrons, can use a variety of algorithms to generate output information based on adaptive learning. Using the neural network 236, the ML component 600 performs a variety of different types of analysis, including single linear regression, multiple linear regression, logistic regression, stepwise regression, binary classification, multiclass classification, multivariate adaptive regression splines, locally estimated scatterplot smoothing, a combination thereof, and so forth.

In at least some embodiments, one or more neural networks 236 are trained to, for example, output reprojected world images 226, reprojected VR images 306, reprojected opacity images 506, occluder masks 308, estimated occlusion images 310, unwanted occlusion images 514, masked world images 516, display images 312, a combination thereof, or the like. The neural network 236, in at least some embodiments, is trained using one or more training techniques, such as supervised learning, unsupervised learning, semi-supervised learning, reinforcement learning, federated learning, active learning, ensemble learning, a combination therefore, or the like. In at least some embodiments, the ML component 600 uses one or both of statistical analysis and adaptive learning to map an input to an output. For instance, the ML component 600 uses characteristics learned from training data to correlate an unknown input to an output that is statistically likely within a threshold range or value. This allows the ML component 600 to receive complex input and identify a corresponding output.

In the depicted example, the neural network 236 includes an input layer 604, an output layer 606, and one or more hidden layers 608 positioned between the input layer 604 and the output layer 606. Each layer has an arbitrary number of nodes, where the number of nodes between layers can be the same or different. That is, the input layer 604 can have the same number and/or a different number of nodes as output layer 606, the output layer 606 can have the same number and/or a different number of nodes than the one or more hidden layer 608, and so forth.

Node 610 corresponds to one of several nodes included in input layer 604, wherein the nodes perform separate, independent computations. As further described, a node receives input data and processes the input data using one or more algorithms to produce output data. Typically, the algorithms include weights and/or coefficients that change based on adaptive learning. Thus, the weights and/or coefficients reflect information learned by the neural network. Each node can, in some cases, determine whether to pass the processed input data to one or more next nodes. To illustrate, after processing input data, node 610 can determine whether to pass the processed input data to one or both of node 612 and node 614 of hidden layer 608. Alternatively or additionally, node 610 passes the processed input data to nodes based upon a layer connection architecture. This process can repeat throughout multiple layers until the neural network 236 generates an output using the nodes (e.g., node 616) of output layer 606.

A neural network can also employ a variety of architectures that determine what nodes within the neural network are connected, how data is advanced and/or retained in the neural network, what weights and coefficients the neural network is to use for processing the input data, how the data is processed, and so forth. These various factors collectively describe a neural network architecture configuration, such as the neural network architecture configurations briefly described above. To illustrate, a recurrent neural network, such as a long short-term memory (LSTM) neural network, forms cycles between node connections to retain information from a previous portion of an input data sequence. The recurrent neural network then uses the retained information for a subsequent portion of the input data sequence. As another example, a feed-forward neural network passes information to forward connections without forming cycles to retain information. While described in the context of node connections, it is to be appreciated that a neural network architecture configuration can include a variety of parameter configurations that influence how the neural network 236 processes input data.

A neural network architecture configuration of a neural network can be characterized by various architecture and/or parameter configurations. To illustrate, consider an example where the neural network 236 implements a convolutional neural network (CNN). Generally, a convolutional neural network corresponds to a type of DNN in which the layers process data using convolutional operations to filter the input data. Accordingly, the CNN architecture configuration can be characterized by, for example, pooling parameter(s), kernel parameter(s), weights, and/or layer parameter(s).

A pooling parameter corresponds to a parameter that specifies pooling layers within the convolutional neural network that reduce the dimensions of the input data. To illustrate, a pooling layer can combine the output of nodes at a first layer into a node input at a second layer. Alternatively or additionally, the pooling parameter specifies how and where the neural network pools data in the layers of data processing. A pooling parameter that indicates "max pooling," for instance, configures the neural network to pool by selecting a maximum value from the grouping of data generated by the nodes of a first layer and using the maximum value as the input into the single node of a second layer. A pooling parameter that indicates "average pooling" configures the neural network to generate an average value from the grouping of data generated by the nodes of the first layer and uses the average value as the input to the single node of the second layer.

A kernel parameter indicates a filter size (e.g., a width and a height) to use in processing input data. Alternatively or additionally, the kernel parameter specifies a type of kernel method used in filtering and processing the input data. A support vector machine, for instance, corresponds to a kernel method that uses regression analysis to identify and/or classify data. Other types of kernel methods include Gaussian processes, canonical correlation analysis, spectral clustering methods, and so forth. Accordingly, the kernel parameter can indicate a filter size and/or a type of kernel method to apply in the neural network. Weight parameters specify weights and biases used by the algorithms within the nodes to classify input data. In some embodiments, the weights and biases are learned parameter configurations, such as parameter configurations generated from training data. A layer parameter specifies layer connections and/or layer types, such as a fully connected layer type that indicates to connect every node in a first layer (e.g., output layer 606) to every node in a second layer (e.g., hidden layer 608), a partially-connected layer type that indicates which nodes in the first layer to disconnect from the second layer, an activation layer type that indicates which filters and/or layers to activate within the neural network, and so forth. Alternatively or additionally, the layer parameter specifies types of node layers, such as a normalization layer type, a convolutional layer type, a pooling layer type, and the like.

While described in the context of pooling parameters, kernel parameters, weight parameters, and layer parameters, it will be appreciated that other parameter configurations can be used to form a DNN consistent with the guidelines provided herein. Accordingly, a neural network architecture configuration can include any suitable type of configuration parameter that a DNN can apply that influences how the DNN processes input data to generate output data.

Figure 7:
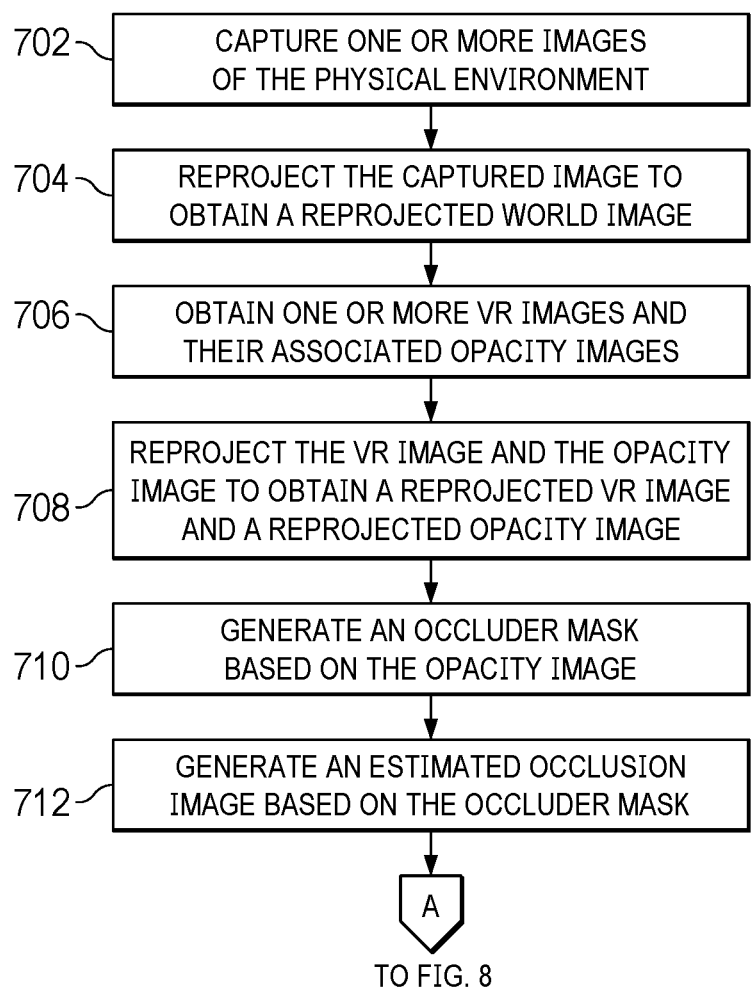
FIG. 7 and FIG. 8 together are a flow diagram illustrating an example method of performing pixelated dimming and digital passthrough techniques in a near-eye display in accordance with at least some embodiments.
Figure 8:
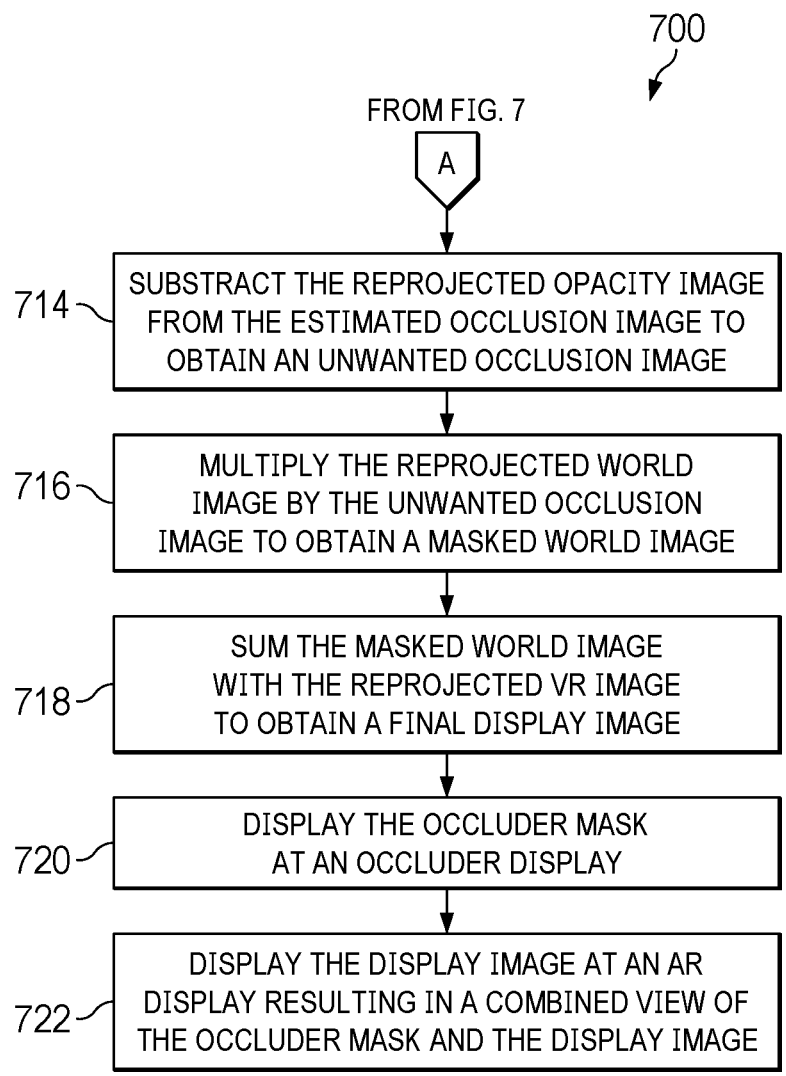

FIG. 7 and FIG. 8 are diagrams together illustrating an example method 700 of performing pixelated dimming and digital passthrough techniques to display mixed reality content at a near-eye display in accordance with at least some embodiments. It should be understood that the processes described below with respect to method 700 have been described above in greater detail with reference to FIG. 2 to FIG. 6. The method 700 is not limited to the sequence of operations shown in FIG. 7, as at least some of the operations can be performed in parallel or in a different sequence. Moreover, in at least some embodiments, the method 700 can include one or more different operations than those shown in FIG. 7.

At block 702, the world-facing camera(s) 220 captures one or more images 502 of the physical environment. At block 704, the world image reprojector 226 performs one or more reprojection operations on the captured images 502 to generate a reprojected world image 302 that correctly aligns with the real world as seen from the user's perspective. At block 706, one or more VR images 304 and their associated opacity images 504 are obtained from a VR image source. At block 708, the VR image reprojector 228 performs one or more reprojection operations on the VR image 304 and opacity image 504 to obtain a reprojected VR image 306 and a reprojected opacity image 506 that correctly aligns with the real world as seen from the user's perspective.

At block 710, the occluder generator 230 processes the opacity image 504 to generate an occluder mask 308. At block 712, the occluder generator 230 processes the occluder mask 308 to generate an occlusion estimate image 310 of the user's blurred view of the occluder display 222. At block 714, the subtractor 508 of the compositor 234 takes the estimated occlusion image 310 and subtracts the opacity image 506 from it, resulting in the unwanted occlusion image 514. At block 716, the multiplier 510 of the compositor 234 takes the reprojected world image 226 and multiples it by the unwanted occlusion image 514, resulting in a masked world image 516. At block 718, the adder 512 of the compositor 234 sums the masked world image 516 with the color components of the reprojected VR image 306 to create the final display image 312 to be presented to the user by the AR display 224. At block 720, the occluder display displays the occluder mask 308. At block 722, the AR display displays the display image 312, resulting in a combined view 509 of the occluder mask 308 and the display image 312 being observed by the user.

In some embodiments, certain aspects of the techniques described above may be implemented by one or more processors of a processing system executing software. The software comprises one or more sets of executable instructions stored or otherwise tangibly embodied on a non-transitory computer-readable storage medium. The software can include the instructions and certain data that, when executed by the one or more processors, manipulate the one or more processors to perform one or more aspects of the techniques described above. The non-transitory computer-readable storage medium can include, for example, a magnetic or optical disk storage device, solid-state storage devices such as Flash memory, a cache, random access memory (RAM), or other non-volatile memory device or devices, and the like—The executable instructions stored on the non-transitory computer-readable storage medium may be in source code, assembly language code, object code, or other instruction format that is interpreted or otherwise executable by one or more processors.

A computer-readable storage medium may include any storage medium or combination of storage media accessible by a computer system during use to provide instructions and/or data to the computer system. Such storage media can include but is not limited to, optical media (e.g., compact disc (CD), digital versatile disc (DVD), Blu-Ray disc), magnetic media (e.g., floppy disc, magnetic tape, or magnetic hard drive), volatile memory (e.g., random access memory (RAM) or cache), non-volatile memory (e.g., read-only memory (ROM) or Flash memory), or microelectromechanical systems (MEMS)-based storage media. The computer-readable storage medium may be embedded in the computing system (e.g., system RAM or ROM), fixedly attached to the computing system (e.g., a magnetic hard drive), removably attached to the computing system (e.g., an optical disc or Universal Serial Bus (USB)-based Flash memory), or coupled to the computer system via a wired or wireless network (e.g., network accessible storage (NAS)).

Note that not all of the activities or elements described above in the general description are required, that a portion of a specific activity or device may not be required, and that one or more further activities may be performed, or elements included, in addition to those described. Still further, the order in which activities are listed are not necessarily the order in which they are performed. Also, the concepts have been described with reference to specific embodiments. However, one of ordinary skill in the art appreciates that various modifications and changes can be made without departing from the scope of the present disclosure as set forth in the claims below. Accordingly, the specification and figures are to be regarded in an illustrative rather than a restrictive sense, and all such modifications are intended to be included within the scope of the present disclosure.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims. Moreover, the particular embodiments disclosed above are illustrative only, as the disclosed subject matter may be modified and practiced in different but equivalent manners apparent to those skilled in the art having the benefit of the teachings herein. No limitations are intended to the details of construction or design herein shown, other than as described in the claims below. It is, therefore, evident that the particular embodiments disclosed above may be altered or modified, and all such variations are considered within the scope of the disclosed subject matter. Accordingly, the protection sought herein is as set forth in the claims below.

What is claimed is:

1. A method comprising:
displaying, based on a virtual reality (VR) image, an occluder mask at an occluder display of a near-eye display system;
obtaining an estimated occlusion image representing an estimate of a user's blurred view of the occluder display; and
displaying an image at an additive display of the near-eye display system based on the VR image, the estimated occlusion image, and a world image representing a view of a physical environment from a perspective of the user.

2. The method of claim 1, further comprising:
capturing, by a world-facing camera of the near-eye display system, the world image.

3. The method of claim 1, wherein displaying the occluder mask comprises:
generating the occluder mask based on an opacity image associated with the VR image.

4. The method of claim 3, wherein displaying the occluder mask comprises:
applying a morphological dilation to the opacity image to expand opaque regions of the opacity image in image space.

5. The method of claim 1, wherein displaying the occluder mask comprises:
generating the occluder mask based on opacity information embedded directly within the VR image.

6. The method of claim 1, wherein displaying the occluder mask comprises:
rendering a blocking object directly in an opacity layer of the VR image that is larger than a corresponding virtual object in the VR image.

7. The method of claim 1, wherein displaying the occluder mask comprises:

generating the occluder mask based on at least one of pixel intensity, pixel color, or one or more structures of at least one of the VR image and the world image.

8. The method of claim 1, further comprising:
obtaining the occluder mask from a source providing the VR image.

9. The method of claim 1, wherein obtaining the estimated occlusion image comprises:
applying a blurring effect to the occluder mask that at least one of softens or diffuses edges of occlusion areas in the occluder mask.

10. The method of claim 1, wherein obtaining the estimated occlusion image further comprises:
adjusting a blur size of the blurring effect based on eye tracking data associated with the user, wherein the adjustment of the blur size is correlated to changes in the a pupil size of the user.

11. The method of claim 1, wherein obtaining the estimated occlusion image comprises:
modeling an actual response of the occluder display to a presentation of the occluder mask, wherein the modeling includes at least one of a dynamic range or response times of the occluder display.

12. The method of claim 1, wherein displaying the image comprises:
obtaining an unwanted occlusion image based on subtracting the estimated occlusion image from an opacity image associated with the VR image;
obtaining a masked world image based on multiplying the world image by the unwanted occlusion image; and
obtaining the image based on summing the masked world image with color components of the VR image.

13. A near-eye display system comprising:
an image source to project light comprising an image;
an occluder display to display an occluder mask;
an additive display to display the image;
a world-facing camera to capture a world image; and
a processor to:
obtain the occluder mask based on a virtual reality (VR image);
obtain an estimated occlusion image representing an estimate of a user's blurred view of the occluder display; and
generate the image based on the VR image, the estimated occlusion image, and the world image.

14. The near-eye display system of claim 13, wherein the processor is configured to obtain the occluder mask by:
generating the occluder mask based on an opacity image associated with the VR image.

15. The near-eye display system of claim 13, wherein the processor is configured to obtain the occluder mask by:
generating the occluder mask based on opacity information embedded directly within the VR image.

16. The near-eye display system of claim 13, wherein the processor is configured to obtain the occluder mask by:
rendering a blocking object directly in an opacity layer of the VR image that is larger than a corresponding virtual object in the VR image.

17. The near-eye display system of claim 13, wherein the processor is configured to obtain the estimated occlusion image by:
applying a blurring effect to the occluder mask that at least one of softens or diffuses edges of occlusion areas in the occluder mask.

18. The near-eye display system of claim 13, wherein the processor is further configured to obtain the estimated occlusion image by:
adjusting a blur size of the blurring effect based on eye tracking data associated with the user, wherein the adjustment of the blur size is correlated to changes in the a pupil size of the user.

19. The near-eye display system of claim 13, wherein the processor is configured to generate the image by:
obtaining an unwanted occlusion image based on subtracting the estimated occlusion image from an opacity image associated with the VR image;
obtaining a masked world image based on multiplying the world image by the unwanted occlusion image; and
obtaining the image based on summing the masked world image with color components of the VR image.

20. A non-transitory computer readable medium embodying a set of executable instructions, the set of executable instructions to manipulate at least one processor to:
obtain, based on a virtual reality (VR image), an occluder mask for display at an occluder display of a near-eye display system;
obtain an estimated occlusion image representing an estimate of a user's blurred view of the occluder display; and
generate, for display at an additive display of the near-eye display system, an image based on the VR image, the estimated occlusion image, and a world image representing a view of a physical environment from a perspective of the user.

* * * * *